Jan. 13, 1970  S. C. BELL  3,489,747
1,3-DIHYDRO-5-PHENYL-4H-1,4-BENZODIAZEPIN-2-ONE-3-CARBAMIC
ACID ESTERS AND METHODS FOR THEIR PREPARATION
Filed Feb. 18, 1966
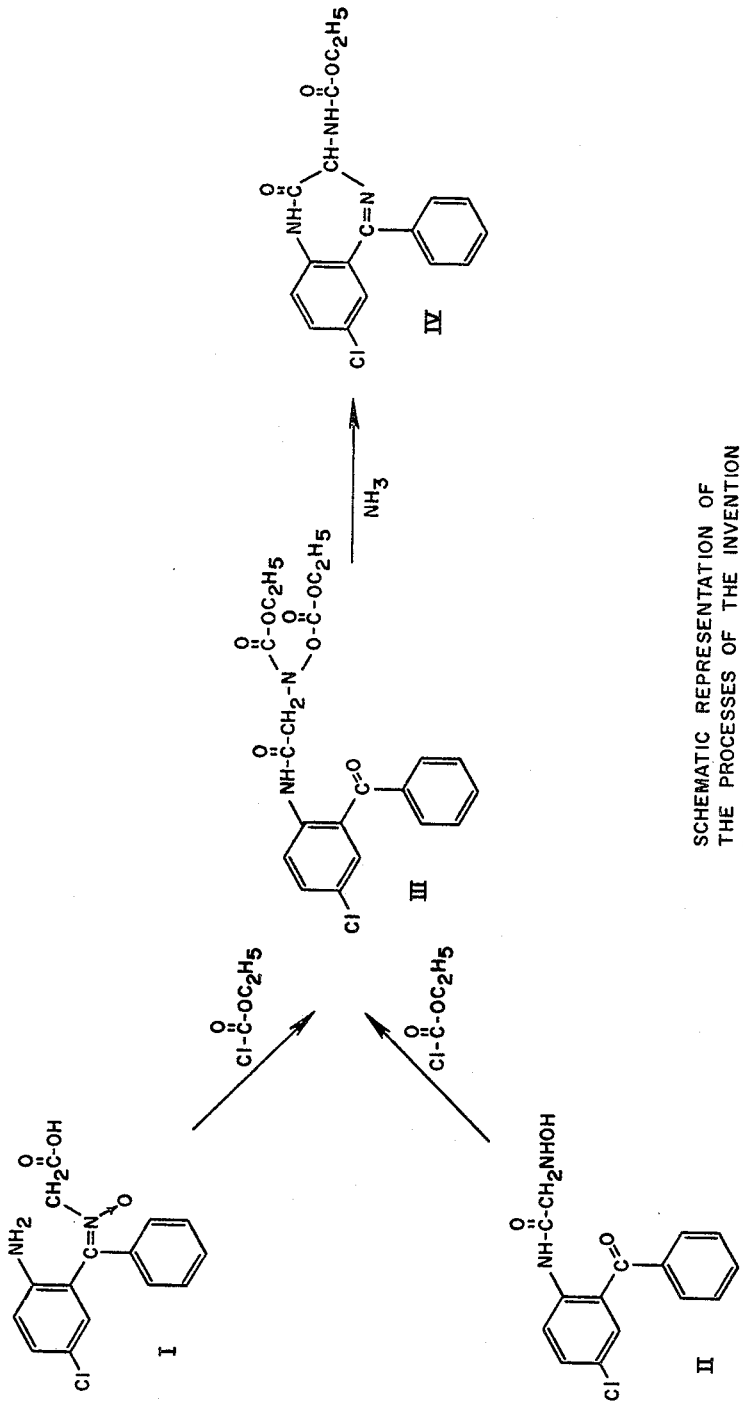
SCHEMATIC REPRESENTATION OF
THE PROCESSES OF THE INVENTION
FOR A SPECIFIC EMBODIMENT THEREOF
INVENTOR
STANLEY C. BELL
BY Vito Victor Bellino
ATTORNEY

United States Patent Office 3,489,747
Patented Jan. 13, 1970

3,489,747
1,3 - DIHYDRO - 5 - PHENYL - 2H - 1,4 - BENZODI-
AZEPIN - 2 - ONE - 3 - CARBAMIC ACID ESTERS
AND METHODS FOR THEIR PREPARATION
Stanley C. Bell, Philadelphia, Pa., assignor to American
Home Products Corporation, New York, N.Y., a corporation of Delaware
Filed Feb. 18, 1966, Ser. No. 528,623
Int. Cl. C07d 53/06; C07c 103/18; A61k 27/00
U.S. Cl. 260—239.3         6 Claims

ABSTRACT OF THE DISCLOSURE

Reacting 2 - amino-α-phenylbenzyl - ideneaminoacetic acid N-oxides or 2-hydroxyaminoacetamidobenzophenones with ethylchloroformate affords [(2-benzoylphenyl-carbamoyl)methyl]hydroxy carbamic acid, ethyl ester, ethyl carbonates; these latter compounds are cyclized by treatment with ammonia to obtain 1,3-dihydro-5-phenyl-2H-1,4-benzodiazepin-2-one-3-carbamic acid, ethyl esters having anti-oxytremorine and central nervous system depressant activity.

---

This invention relates to compositions of matter classified in the art of chemistry as substituted 1,3-dihydro-2H-1,4-benzodiazepin-2-ones, and to intermediates and processes for their preparation.

The invention sought to be patented in its principal composition aspect is described as residing in the concept of a chemical having a molecular structure in which there is attached to a 1,3-dihydro-5-aryl-2H-1,4-benzodiazepin-2-one nucleus, a carbamic acid ester group at the 3-position.

The tangible embodiments of the principal composition aspect of the invention possess the inherent general physical properties of being high melting, white crystalline solids, are substantianlly insoluble in water, and are soluble in polar solvents, such as the lower aliphatic alcohols. Examination of the compounds produced according to the hereinafter described process reveals upon infrared, ultraviolet, and nuclear magnetic resonance spectrographic analysis, spectral data confirming the molecular structure hereinbefore set forth. Thus the carbonyl of the ring and of the urethane linked thereto are evident. The aforementioned physical properties taken together with the nature of the starting materials and the mode of synthesis confirm the structure of the compositions sought to be patented.

The tangible embodiments of the principal aspect of the present invention possess the inherent applied use characteristics of exerting anti-oxytremorine and central nervous system depressant activity as evidenced by standard test procedures.

The invention sought to be patented in a second composition aspect resides in the concept of [(2-benzoylphenylcarbamonyl)methyl]hydroxycarbamic acid, ester, ethyl carbonate.

The tangible embodiments of the second composition aspect of the invention possess the inherent general physical properties of being white crystalline solids, substantially insoluble in water, and are soluble in polar solvents such as the lower aliphatic alcohols. Examination of the compounds produced according to the hereinafter described process reveals upon spectral analysis, spectral data confirming the molecular structure set forth. The physical properties taken together with the nature of the starting materials, the modes of syntheses in the two alternate routes to the second composition aspect presented hereinbelow and the products obtained therefrom, confirm the structure of the second compositions sought to be patented.

The tangible embodiments of the second composition aspect of the invention possess the inherent applied use characteristics of being intermediates for the preparation of the principal compositions of the invention.

The invention sought to be patented in its principal process aspect resides in the concept of converting a 2-amino-α-phenylbenzylideneaminoacetic acid N-oxide to a [(2-benzoylphenylcarbamoyl)methyl] hydroxy carbamic acid, ethyl ester, ethyl carbonate by reacting with ethyl chloroformate and cyclizing the product so produced with ammonia to obtain 1,3-dihydro-5-phenyl-2H-1,4-benzodiazepin-2-one-3-carbamic acid, ethyl ester.

The invention sought to be patented in a second process aspect resides in the concept of converting a 2-hydroxyaminoacetamidobenzophenone to a [(2-benzoylphenylcarbamoyl)methyl] hydroxycarbamic acid, ethyl ester, ethyl carbonate by reacting with ethyl chloroformate and cyclizing the product so produced with ammonia to obtain 1,3-dihydro-5-phenyl-2H-1,4-benzodiazepin-2-one-3-carbamic acid, ethyl ester.

The manner and process of making and using the invention will now be generally described so as to enable a person skilled in the art of chemistry to make and use the same as follows:

Referring to the drawing appended hereto, wherein the compounds are assigned Roman numerals for identification, the sequence of reactions involved in the synthesis of a specific embodiment, namely 7-chloro-1,3-dihydro-5-phenyl-2H-1,4-benzodiazepin-2-one-3-carbamic acid, ethyl ester, is illustrated.

The 2-amino-α-phenylbenzylideneaminoacetic acid N-oxides(I), starting materials for the principal process of the invention and which are employed for the preparation of the compositon of the invention, are obtained as described in co-pending U.S. application Ser. No. 297,705, filed July 25, 1963, now abandoned. When a mixture of a 2-amino-α-phenylbenzylideneaminoacetic acid N-oxide and 25 ml. of ethyl chloroformate in 25 ml. of a solvent, preferably chloroform, are heated and maintained at reflux temperature for a period of about two hours, applicant has discovered that a remarkable and unusual rearrangement occurs. The moiety attached through carbon to the 1-position of phenyl becomes attached by means of the end carbon to the nitrogen atom at the 2-position and the bond between the linking carbon and the head-end nitrogen is broken. A possible explanation for the unusual rearrangement is the formation of a cyclic hypothetical intermediate, as follows:

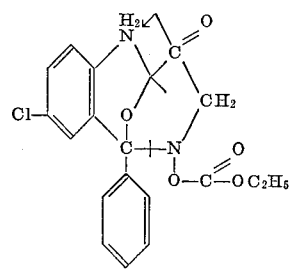

The product, so obtained, is purified by recrystallization methodsd known to those skilled in the art, as for example, from a bi-solvent system such as 1:1 ethylacetate/hexane, crystallization being induced by adding more hexane, and is a [(2-benzoylphenylcarbamoyl)methyl] hydroxycarbamic acid, ethyl ester, carbonate (III). Addition of this product to alcoholic ammonia followed by heating effects a cyclization to a 1,3-dihydro-5-phenyl-2H-1,4-benzodiazepin-2-one-3-carbamic acid, ethyl ester (IV).

The [(2-benzoylphenylcarbamoyl)methyl] hydroxycarbamic acid, ethyl ester, ethyl carbonates (I) can be prepared by reacting ethyl chloroformate with a 2-hydroxy-aminoacetamidobenzophenone (II). The manner of making 2-hydroxyaminoacetamidobenzophenones used in this alternate procedure are described in co-pending application Ser. No. 301,873 filed Aug. 13, 1963, now abandoned. A mixture of the two reactants is refluxed for about 3 hours, preferably with excess ethyl chloroformate as the solvent. On removal of the solvent and trituration with a small amount of ethanol, the desired ester, ethyl carbonate is obtained which can be cyclized as hereinbefore described to give the corresponding 1,3-dihydro-5-phenyl-2H-1,4-benzodiazepin-2-one-3-carbamic acid, ethyl ester.

It will be apparent from the disclosure herein to those skilled in the art that for the purposes of the invention, certain of the atoms of the α-phenylbenzylideneamino-acetic acid N-oxide or the hydroxyaminoacetamidobenzophenone starting materials could be substituted at certain positions with groups which do not interfere with the subsequent reactions and are not themselves affected by the subsequent reactions. Thus the phenyl of the α-phenylbenzylideneaminoacetic acid N-oxides and the phenyl to which the amide nitrogen is attached to the hydroxyacetamidobenzophenones, may in lieu of hydrogen be substituted, for example, but without limitation thereto, with groups such as the halogens, chloro, bromo, or iodo; alkyl, methyl, ethyl or isopropyl; alkoxy, methoxy, ethoxy, or isopropoxy, at the 3, 4, 5, and 6 positions. The phenyl of the benzylidene group of the α-phenyl-benzylideneaminoacetic acid N-oxides and the phenyl of the benzoyl group of the hydroxyacetamidobenzophenones, may similarly, in lieu of hydrogen, be substituted, for example, but without limitation thereto, with groups at the 2, 3, 4, 5, and 6-position such as those hereinbefore specified for the other phenyl in the starting material molecule. Furthermore, the in lieu of the phenyl of the benzoyl grouping in the hydroxyaminoacetamidobenzophenone, heterocyclic aryl groups as, for example, but without limitation thereto, thienyl, pyridyl, furyl, or cycloalkano, such as cyclopentyl or cyclohexyl, can be present.

It will also be apparent to those skilled in the art that for the purposes of this invention, other alkyl chloroformates can be substituted for ethyl chloroformate in the processes of the invention. Other reactive ester acid chlorides such as tosyl or mesyl can also be used in lieu thereof.

When the starting compounds are substituted as hereinbefore recited, it will be apparent herefrom to those skilled in the art of chemistry, that the final product formed in the process of the invention will bear correspondingly the same substituents. It will be apparent that the phenyl group of the benzylidene group of the α-phenylbenzylidene-aminoacetic acid N-oxides and the phenyl to which the amide nitrogen is attached to the hydroxyacetamido benzophenone becomes the benzo group of the product 5-phenylbenzodiazepin-2-one and that the α-phenyl group of the α-phenylbenzylideneaminoacetic acid N-oxide and the phenyl of the benzoyl group of the hydroxyacetamidobenzophenone becomes the 5-phenyl group of the product 5 - phenylbenzodiazepin-2-one. Similarly whatever the group is in the alcohol group of the ester portion of the alkyl chloroformate, this group will be the alcohol group of the ester in the carbamic acid ester attached to the 3-position of the product 5-phenylbenzodiazepin-2-one. Thus for the processes of the invention and for the product of the invention produced thereby, such groups are the full equivalents of the invention as particularly claimed.

The following examples illustrate the best mode contemplated by the inventor of using the claimed process of the invention and of the manner of making the claimed compositions of the invention.

EXAMPLE 1

Preparation of [(2 - benzoyl - 4 - chlorophenylcarbamoyl) methyl]hydroxycarbamic acid, ethyl ester ethyl carbonate Reflux a mixture of 4.0 g. of 5-chloro-α-phenylbenzylideneaminoacetic acid N-oxide, 25 ml. of chloroform and 25 ml. of ethyl chloroformate for 2 hours. Remove the solvent under reduced pressure. Dissolve the residue in a mixture of 30 ml. of ethyl acetate and 30 ml. of hexane, filter to remove undissolved impurities. Dilute with an additional 30 ml. of hexane. Cool and allow the solution to stand in the cold for 24 hours to cause the product to crystallize. Filter to obtain 1.9 g. of the title product, M.P. 101–102°.

*Analysis.*—Calculated for $C_{21}H_{21}ClN_2O_7$: C, 56.20; H, 4.72; N, 6.23; Cl, 7.90. Found: C, 55.98; H, 4.75; N, 5.81; Cl, 7.90.

EXAMPLE 2

Alternate preparation of [(2-benzoyl-4-chlorophenyl carbamoyl)methyl]hydroxy carbamic acid, ethyl ester ethyl-carbonate Reflux a mixture of 0.5 g. of 5-chloro-2-hydroxyamino-acetamido-benzophenone and 15 ml. of ethylchloroformate for 3 hours. Remove the solvent under reduced pressure. Triturate the residue with a small amount of cold ethanol. Filter to obtain 0.15 g. of the title compound, M.P. 101–102°.

EXAMPLE 3

Preparation of 7-chloro-1,3-dihydro-5-phenyl-2H-1,4-benzodiazepin-2-one-3-carbamic acid, ethyl ester Add to a solution of concentrated ammonium hydroxide and ethanol, 300 mg. of [(2-benzoyl-4-chlorophenyl-carbamoyl)methyl]hydroxy carbamic acid, ethyl ester, ethyl carbonate. Heat to boiling to dissolve and concentrate to ½ of its original volume. Dilute with water, acidify with acetic acid and filter to remove solid impurities. Cool and filter to obtain the title compound, M.P. 253–255°.

*Analysis.*—Calculated for $C_{18}H_{16}ClN_3O_3$: C, 60.42; H, 4.51; N, 11.74; Cl, 9.91. Found: C, 60.58; H, 4.21; N, 12.00; Cl, 9.90.

The subject matter which the applicant regards as his invention is particularly pointed out and distinctly claimed as follows:

1. 7 - chloro - 1,3 - dihydro - 5 - phenyl - 2H - 1,4-benzodiazepin-2-one-3-carbamic acid, ethyl ester.

2. The process of preparing a 1,3-dihydro-5-phenyl-2H-1,4-benzodiazepin-2-one-3-carbamic acid, ether ester comprising the following steps:
   (a) reacting a 2-amino-α-phenylbenzylideneaminoacetic acid N-oxide with ethyl chloroformate to produce a [(2 - benzoylphenylcarbamoyl)methyl]hydroxycarbamic acid, ethyl ester, ethyl carbonate, and
   (b) cyclizing the product so-produced with ammonia.

3. Step (b) of the process of claim 2.

4. The process of claim 2 wherein the 2-amino-α-phenylbenzylideneaminoacetic acid N-oxide is substituted with chlorine at the 5-position.

5. The process of claim 3 wherein the product from step (a) is substituted with chlorine at the 5-position.

6. The process of preparing a 1,3-dihydro-5-phenyl-2H-1,4-benzodiazepin-2-one-3-carbamic acid, ethyl ester comprising the following steps:
  (a) converting a 2-hydroxyaminoacetamido benzophenone to a [(2-benzoylphenylcarbamoyl)methyl]hydroxycarbamic acid, ethyl ester, ethyl carbonate by reacting with ethyl chloroformate, and
  (b) cyclizing the product so-produced with ammonia.

References Cited

UNITED STATES PATENTS 3,346,565  10/1967  Testa et al. _____ 260—239.3

HENRY R. JILES, Primary Examiner
R. T. BOND, Assistant Examiner

U.S. Cl. X.R.
260—463, 471, 518, 999